Jan. 24, 1967  T. C. MIZEJEWSKI  3,299,692
VELOCITY MEASURING AND SEGREGATING DEVICE
FOR PROPELLED ARTICLES
Filed March 19, 1964  6 Sheets-Sheet 1

INVENTOR.
Theodore C. Mizejewski
BY
Johnson and Kline
ATTORNEYS

Jan. 24, 1967 T. C. MIZEJEWSKI 3,299,692
VELOCITY MEASURING AND SEGREGATING DEVICE
FOR PROPELLED ARTICLES
Filed March 19, 1964 6 Sheets-Sheet 3

INVENTOR.
Theodore C. Mizejewski
BY
Johnson and Kline
ATTORNEYS

Jan. 24, 1967 T. C. MIZEJEWSKI 3,299,692
VELOCITY MEASURING AND SEGREGATING DEVICE
FOR PROPELLED ARTICLES
Filed March 19, 1964 6 Sheets-Sheet 4
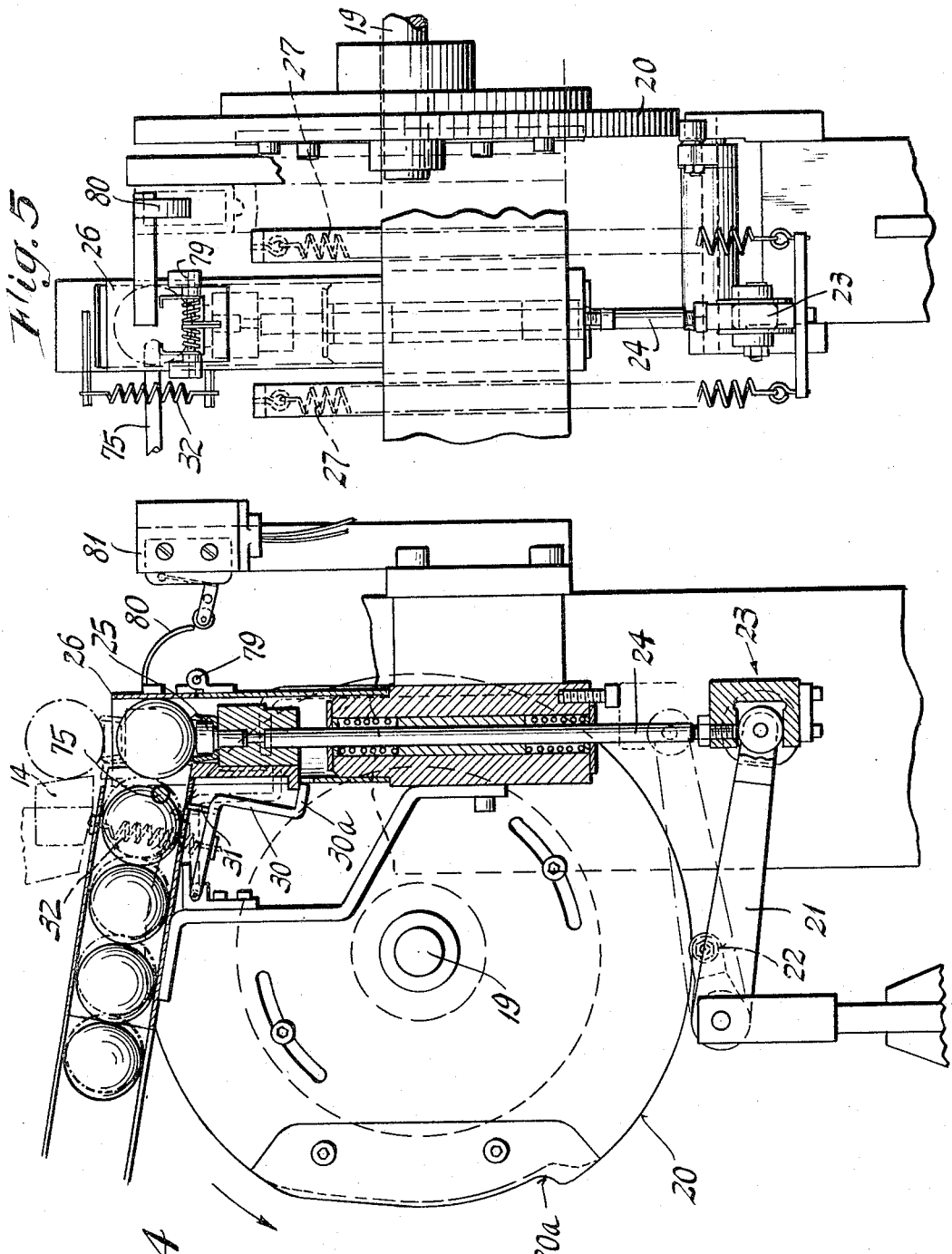
INVENTOR.
Theodore C. Mizejewski
BY
Johnson and Kline
ATTORNEYS

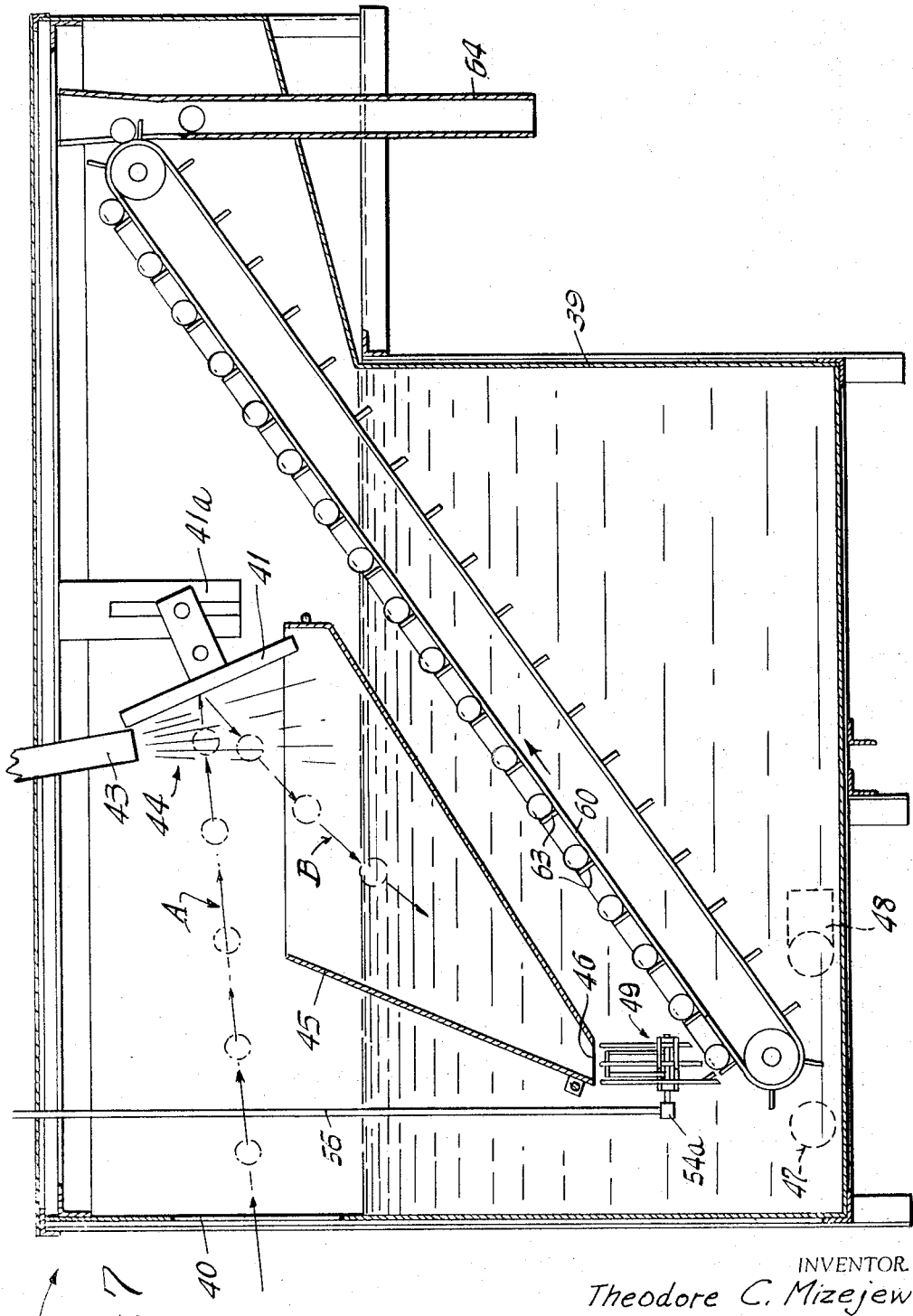

INVENTOR.
Theodore C. Mizejewski
BY
Johnson and Kline
ATTORNEYS

United States Patent Office 3,299,692
Patented Jan. 24, 1967

3,299,692
VELOCITY MEASURING AND SEGREGATING
DEVICE FOR PROPELLED ARTICLES
Theodore C. Mizejewski, Springfield, Mass., assignor to
A. G. Spalding & Bros., Inc., Chicopee, Mass., a corporation of Delaware
Filed Mar. 19, 1964, Ser. No. 353,104
8 Claims. (Cl. 73—13)

The present invention relates to a novel device for measuring the velocity of and/or segregating a propelled article, and more particularly for measuring the initial velocity of a driven golf ball and for segregating the balls in accordance with the velocity measurement.

Heretofore, it has been the practice of periodically sampling golf ball production and testing and measuring propelled balls to determine the initial velocity thereof so that it could be determined whether the balls are within the required standard velocity range. Since the balls being tested were usually damaged and had to be removed from the production, only small samplings could economically be taken.

The present invention overcomes this difficulty by providing a novel velocity measuring device which reduces the damage to the propelled ball so that all balls produced can be tested without sacrificing production.

It is an object of the present invention to provide a ball testing device in which the balls are automatically segregated in accordance with the test measurement.

It is another object of the invention to provide a novel receiving unit for use in testing the velocity of propelled articles, such as golf balls, in which a flow of liquid extending transversely of the path of the projected article or ball reduces the force thereof so that it impinges upon a rebound plate with a lesser force and hence is not damaged in testing.

It is a further object of the present invention to provide a novel segregating means by which the tested balls can be separated into those falling within the standard range, those whose initial velocity is above standard and those whose initial velocity is below standard.

Other features and advantages of the invention will be apparent from the specification and claims when considered in connection with the accompanying drawings in which:

FIG. 4 is a detail view, partly in section, of the ball teeing mechanism.

FIG. 5 is an elevational view looking at the right of FIG. 4.

FIG. 7 is a sectional view taken along line 7—7 of FIG. 6.

FIG. 11 is a detail view of the solenoid-operated plunger for controlling the feed of the balls.

Figure 1:
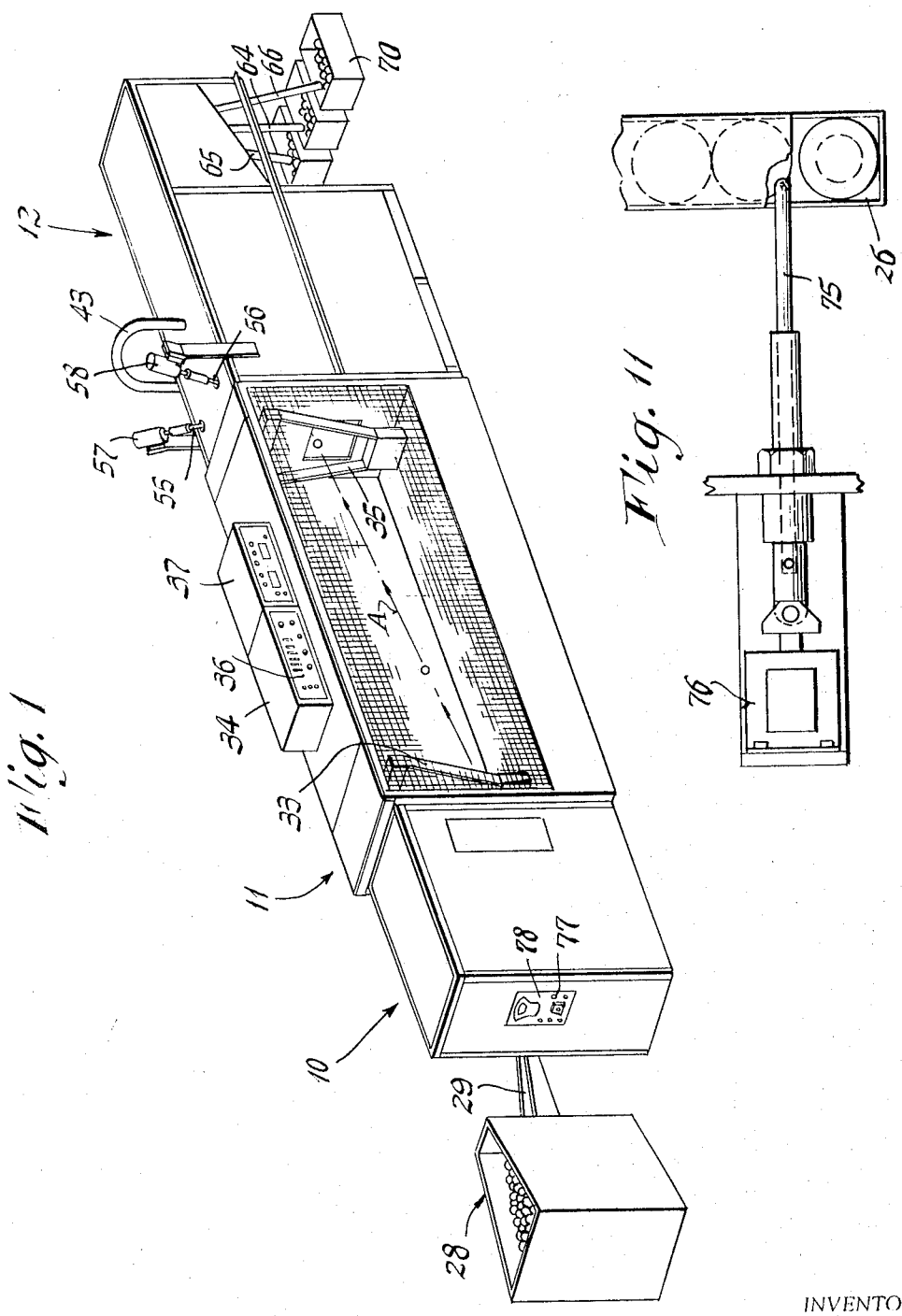
FIGURE 1 shows a perspective view of the testing device.

As shown in the drawings, the invention is illustrated in a golf ball testing and segregating device which comprises a ball driving unit 10, a velocity measuring unit 11 and a receiver unit 12.

Figure 2:
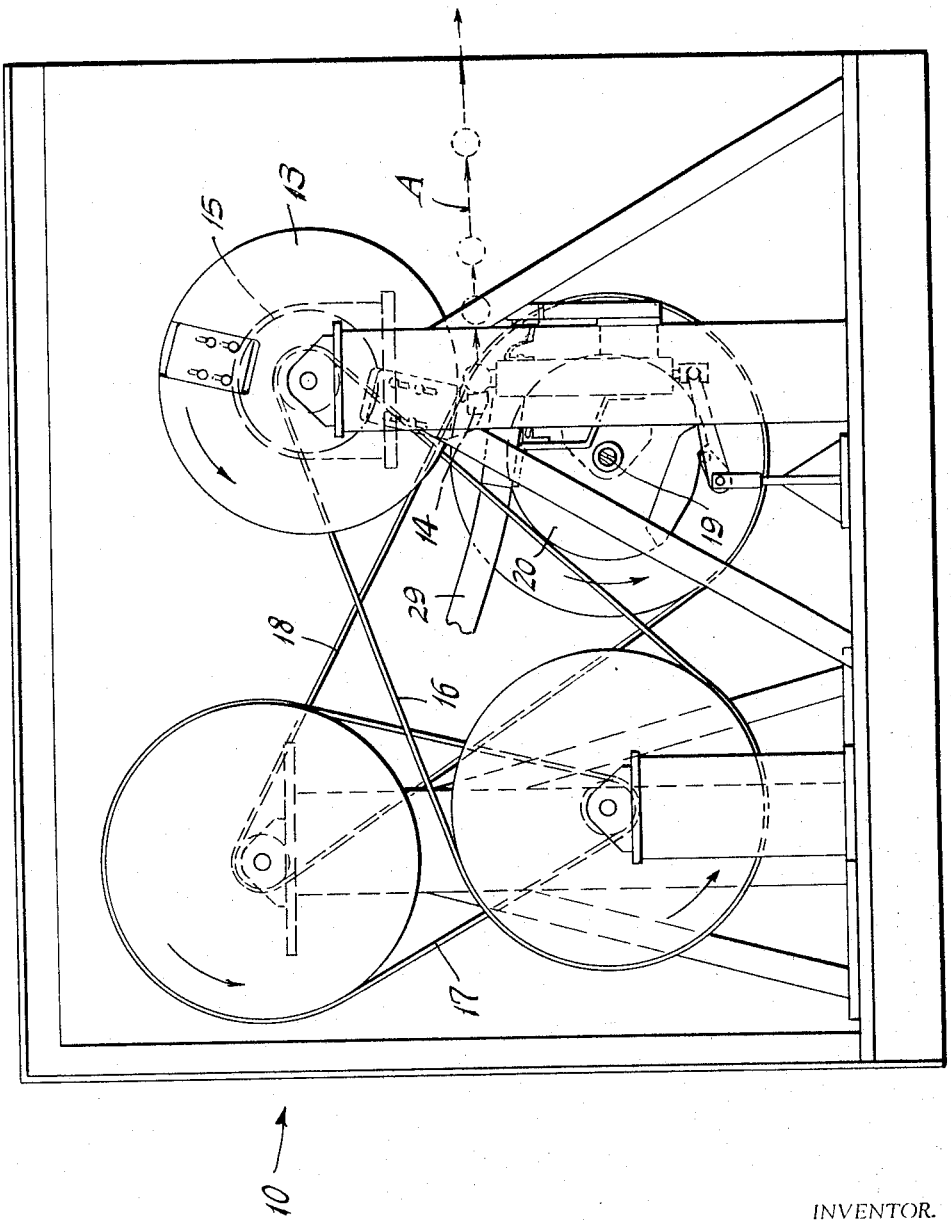
FIG. 2 shows a side elevational view of the ball driving unit showing the belt driving mechanism therefor.
Figure 3:
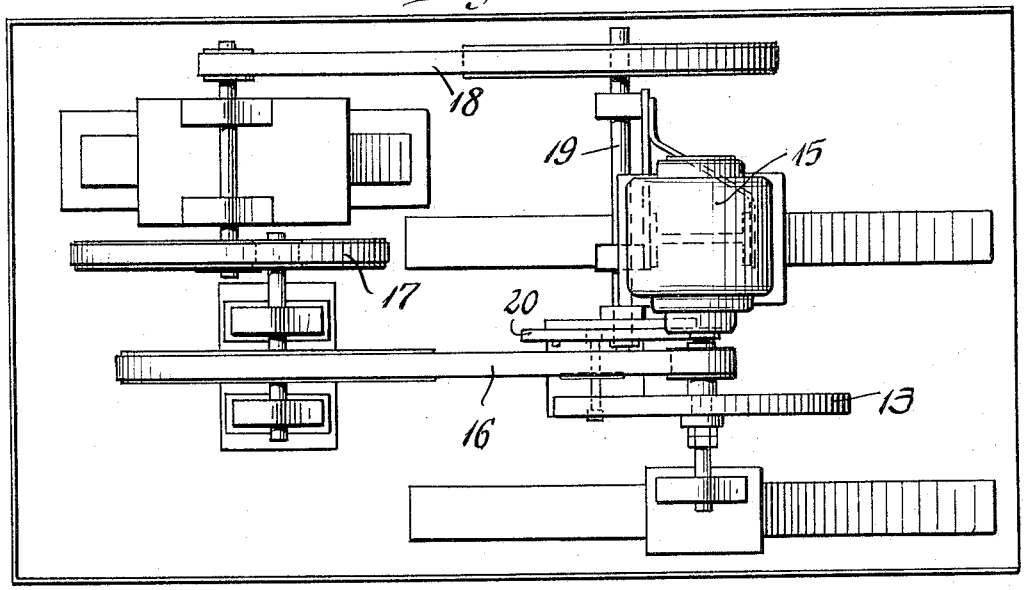
FIG. 3 is a top view of FIG. 2.

While the ball driving means may take various forms, in the herein illustrated form of the invention the ball driving means, as shown in FIGS. 1–5, comprises a striker wheel 13 having a striker element 14 thereon. The striker wheel is driven at a constant high speed by a constant speed motor 15 (FIG. 3) and there is provided means for feeding golf balls and teeing them in a striking position, which means is driven in timed relation with the rotation of the striker wheel. Although the means for driving the teeing means may take many forms, in the herein illustrated form of the invention this means comprises a series of belts 16, 17, 18 and their cooperating pulleys, as shown in FIGS. 2 and 3 driven by the motor 15 for driving a shaft 19 on which a ball elevating cam 20, (FIG. 4) is mounted. The cam cooperates with a pivoted lever 21 having a cam roller 22 engaging the cam surface, the free forward end of the lever having a driving connection 23 to an elevating rod 24 having a ball supporting member or tee 25 on the upper end movable within a ball supporting chamber 26. The rod is urged to a raised position by springs 27 (FIG. 5) but normally is held in a retracted position by the action of the cam. As the cam follower engages the recess 20a in the cam, the ball elevating mechanism will raise the ball to the teeing position as shown in the dot and dash position in FIG. 4.

The golf balls to be tested are positioned in a hopper 28 and fed from the hopper to a chute 29 leading to the ball elevating mechanism. The balls in the chute, as shown in FIG. 4, are held from moving forward during the elevating operation by means of a pivoted lever 30 having projections 31 extending into the chute. The lever is normally urged to a raised position by a spring 32 in which the projections hold the balls from moving into the ball elevating chamber while the ball elevating means is out of normal position. The lever is provided with an extension 30a extending into cooperative relation with the ball elevating means so that as the ball elevating means moves from the retracted position to tee the ball in a striking position, the lever will move the projections into obstructing position and hold the balls in the chute.

After the ball has been propelled from the tee, the ball elevating means returns to said retracted position and in doing so moves the lever to the position of FIG. 4 wherein the projections 31 are removed from obstructing position and the first ball in the chute moves into position on the tee ready to be moved into a raised position as the elevating means is actuated to raise the ball into striking position.

When the ball is struck by the striking element, it travels in a predetermined path, as indicated by the dot and dash arrows A and passes into the velocity measuring unit 11. While any suitable velocity measuring means may be employed to measure the initial velocity of the propelled ball, in the illustrated form of the invention, the ball, as it enters into the unit, passes through an electronic screen 33 located just inside the measuring unit and this triggers a suitable electronic counter (not shown) in a measuring device 34 which counts the elapsed time until the ball passes through a second electronic screen 35, located a predetermined distance from screen 33, which interrupts or stops the action of said electronic counter. The elapsed time in microseconds for the ball to travel said predetermined distance between screens 33 and 35 will be a measurement of the initial velocity of the ball. The information from the counting unit, which may also be shown on the indicator 36 of the measuring device 34, is passed as an electrical signal to a comparator unit 37 of any suitable construction. The said signal is compared with a standard set up in the comparator unit and the resultant of the comparison produces a control signal for use in segregating the balls in accordance with the measured initial velocity as will be explained.

As the ball leaves the measuring unit, it passes into the receiving unit 12 which is shown in detail in FIGS.

6–10. The receiving unit comprises a tank 39 having an opening 40 in one end through which the ball can enter the tank and is provided with a downwardly and rearwardly inclined polished stainless steel rebounding plate 41. The plate is adjustably mounted therein at 41a and is located in a position in which the balls moving in the predetermined path A will impinge against it.

Figure 6:
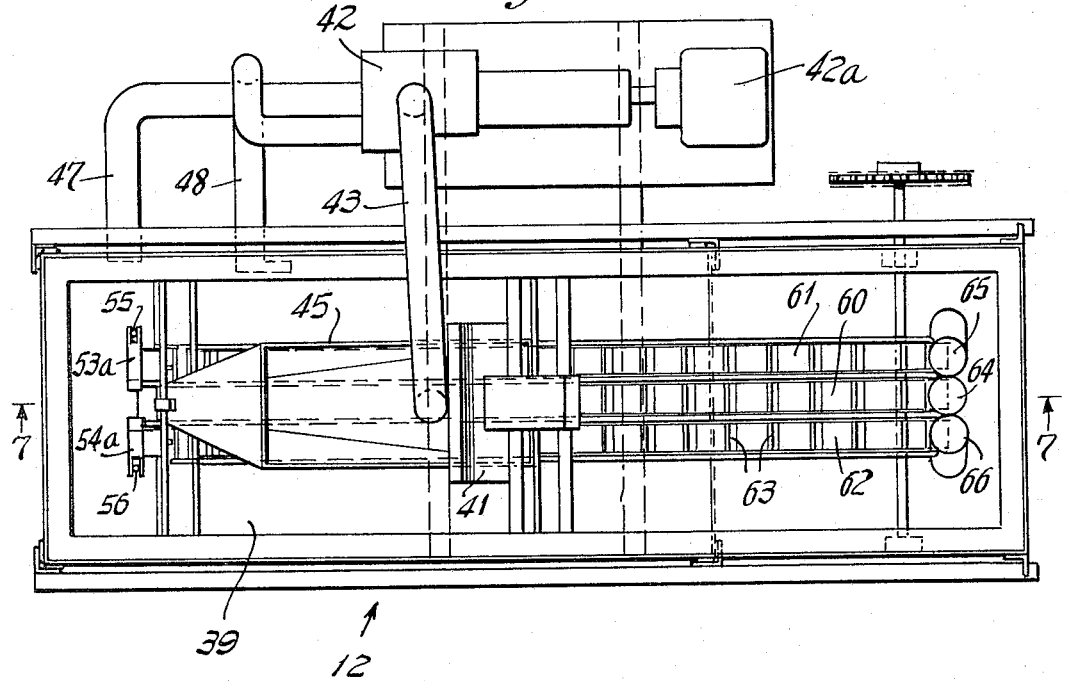
FIG. 6 is a top view of the receiver unit.

As shown in FIGS. 6 and 7, a supply of a damping liquid, preferably water, is pumped by a pump 42 driven by a motor 42a and is passed through a pipe 43 at the top of the unit and falls in a column 44 downwardly transversely of the path of movement of the ball so as to engage the ball and reduce the velocity of the ball prior to its impingement on the plate. The ball rebounds downwardly, as shown by the arrow B in FIG. 7, into an article or ball receiving cone 45 and toward an opening 46 in the bottom thereof. The water also flows into the cone and out through the opening 46 in the bottom of the cone and is withdrawn through a return pipe 47 to the pump 42. If desired, a separate pipe 48 may be provided for filling, emptying, or controlling the water in the tank. The flow of water in the cone will be in the same direction as the movement of the rebounding ball and tends to control the movement of the ball toward the opening as well as to further reduce the velocity of the ball.

Figure 9:
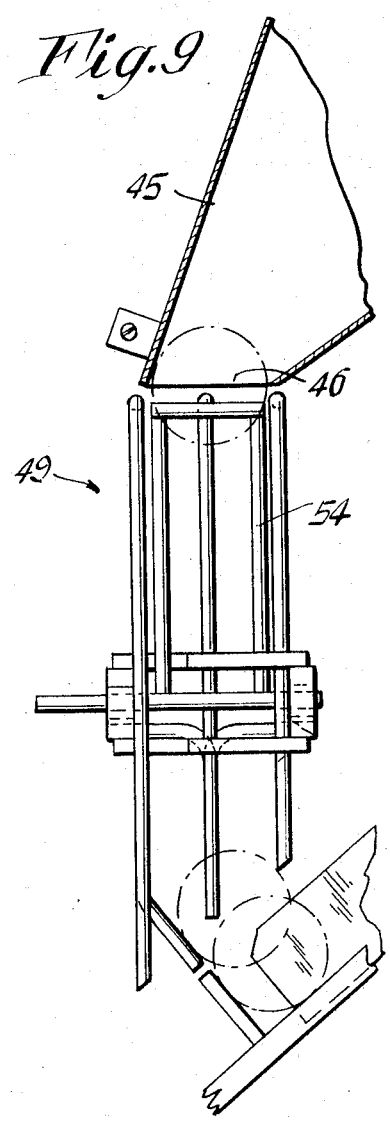
FIG. 9 is a side view of FIG. 8.
Figure 10:
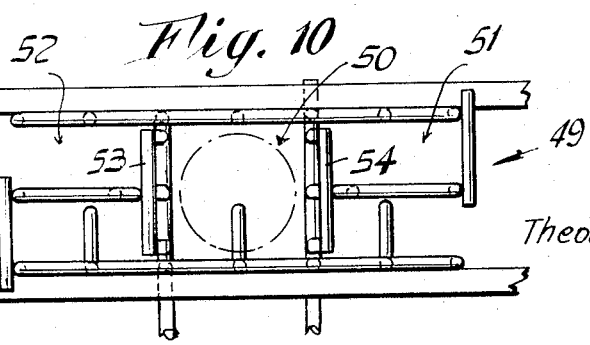
FIG. 10 is a top view of FIG. 8.

Located in the tank below the opening 46 in the bottom of the ball receiving cone is a separator unit 49. While the separator unit may take many forms, it is herein illustrated and shown in detail in FIGS. 8–10 as comprising a cage-like structure of rods which form a central passage 50 aligned with the opening 46 in the receiver cone and also provided with side passages 51, 52 on either side of the central passage. The upper sides of the central passage are formed by pivoted rods or gates 53, 54 which, when actuated, divert a ball leaving the opening 46 and prevent it from entering the central passage and direct it into either of the side passages.

Figure 8:
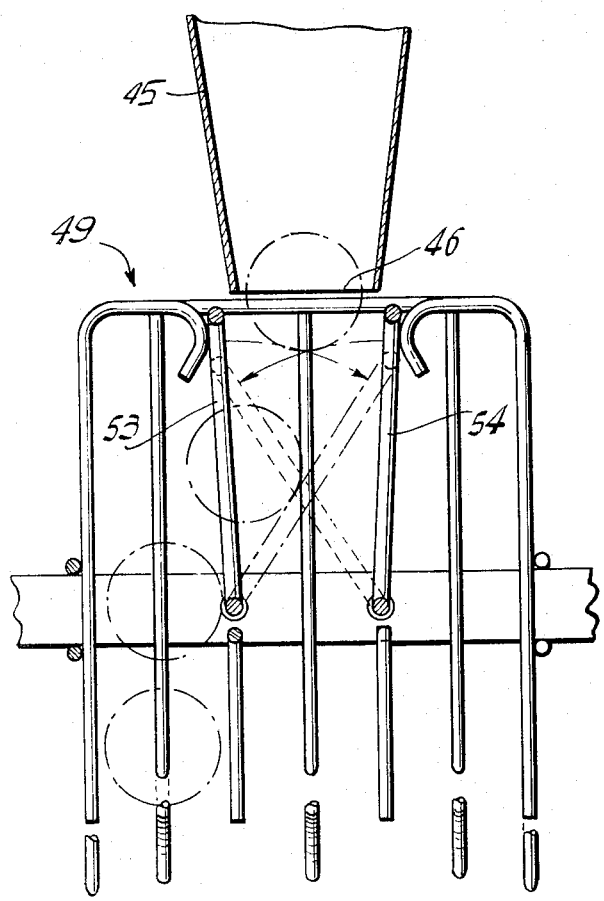
FIG. 8 is a detail front view, partly in section, of the separator unit for segregating the balls.

The gates are connected by couplers 53a, 54a to be operated by rods 55, 56 actuated by a pair of solenoid-operated air cylinders 57, 58, which air cylinders are connected to the comparator unit 37 and are actuated by the control signal sent out by the comparator unit in response to a comparison of the initial velocity of the ball being measured to a standard. For example, if the ball being measured is within a given acceptable range, no control signal is sent out and the gates will retain the solid line positions as shown in FIG. 8. However, if the comparison shows the ball to be of a velocity higher than the required standard, a control signal will be sent out to solenoid-operated air cylinder 57 which will move the gate 53 to the dash position as shown in FIG. 8 and direct the balls into the right-hand side passage 51 of the separator unit. If the comparator signal shows the velocity less than the standard, the control signal will actuate the other solenoid-operated air cylinder 58 and the gate 54 will be actuated to the dash position shown in FIG. 8 and the balls will be directed into the left-hand passage 52 of the separator unit.

Each of the three passages of the separator unit opens onto a separate upwardly inclined conveyor belt 60, 61 and 62, each having transverse cleats 63 thereon which carries the balls upwardly and drops them into tubes 64, 65, 66 which, as shown in FIG. 1, direct the balls into the separate baskets 70, thus segregating the balls into three categories—those which satisfy the requirements, those which are over, and those which are under, the standard permitted range.

If desired, protective means can be provided for preventing damage in the machine due to malfunctioning of the machine and for stopping the machine in the event that the balls are improperly hit. As shown in FIGS. 4, 5 and 11, a solenoid-operated plunger 75 is provided which is normally urged by suitable means to the position shown in FIG. 11 wherein it projects into the path of the balls in the chute and prevents them from feeding into a supported position on the tee 25. An operating solenoid 76 is connected in the electrical circuit for the machine (not shown) and is energized to retract the holding pin when the machine has reached the desired proper striking speed. While this can be done by a governor on the striking wheel or by other suitable automatic means, it is at present preferred to energize the solenoid to retract the plunger by a push button 77 on the panel 78.

Further, as shown in FIG. 4, the ball supporting chamber 26 is pivoted at 79 and has an actuator 80 adapted to cooperate with a microswitch 81 secured to the frame and connected in the electrical circuit to open the circuit to the solenoid and the driving mechanism of the machine in the event that there is a malfunctioning of the feeding means or the striking means which will cause the cup to pivot about the pivot 79 and actuate the switch which will stop the machine and deenergize the solenoid to cause the pin 75 to hold the balls from moving down the chute into the path of the ball elevating device until the trouble is cleared.

A feature of this invention resides in the fact that the balls have their velocity substantially reduced prior to the impingement thereof with the stainless steel plate so that the surface of the ball is not damaged, thus permitting all of the balls to be tested since the tested balls do not have to be removed from production.

In accordance with the present invention, the rate at which the water moves downwardly in the cone, as controlled by the water circulating system, determines or regulates the rate at which the ball moves downwardly through the ball receiving cone and into the separating unit. This rate must be so adjusted that the ball will pass into the separating unit and be properly segregated before the signal from a successive ball operates the gates thereof. This will insure accurate segregation of the balls into the desired initial velocity categories.

Variations and modifications may be made within the scope of the claims and portions of the improvements may be used without others.

I claim:

1. In a golf ball testing device, means for striking a ball with a predetermined force to propel the ball through a predetermined path to a receiver unit, velocity measuring means disposed in said path to measure the velocity of the ball, means feeding the measured velocity to a comparator unit for comparison with a standard velocity to produce a control signal in accordance with said comparison, means in the receiver unit for segregating the balls in accordance with the control signal, and means feeding the segregated balls from said receiver unit, the improvement wherein said receiver unit has a downwardly and rearwardly inclined rebound plate against which the propelled balls impinge and rebound and a stream of water flowing downwardly across the path of the ball to intercept the ball prior to its contact with said plate to reduce the velocity thereof, said stream engaging and directing the rebounding ball to the means for segregating the balls.

2. In a golf ball testing device, means for striking a ball with a predetermined force to propel the ball through a predetermined path to a receiver unit, velocity measuring means disposed in said path to measure the velocity of the ball, means feeding the measured velocity to a comparator unit for comparison with a standard velocity to produce a control signal in accordance with said comparison, and means in the receiver unit for segregating the balls in accordance with the control signal, the improvement wherein said receiver unit comprises a tank having a downwardly inclined rebound plate in said predetermined path against which the propelled balls are projected and rebound downwardly toward a ball catching cone disposed below said plate, means feeding a stream of water into the tank at the top thereof to form a column of water flowing downwardly across said predetermined path and located to engage the ball just prior to the contact thereof with the rebound plate and with the column flowing into the ball catching cone in the path of movement of the balls rebounding from said rebound plate, a plurality of conveyors leading from the bottom of the catching cone, and gate means at the bottom of the cone for directing the balls received from the plate to said conveyors in accordance with the control signal for segregating said balls.

3. In a golf ball testing device, means for striking a ball with a predetermined force to propel the ball through a predetermined path to a receiver unit, velocity measuring means disposed in said path to measure the velocity of the ball, means feeding the measured velocity to a comparator unit for comparison with a standard velocity to produce a control signal in accordance with said comparison, and means in the receiver unit for segregating the balls in accordance with the control signal, the improvement wherein the receiver unit comprises a tank having a downwardly inclined rebound plate in said predetermined path against which the propelled balls are projected and rebound downwardly toward a ball catching cone adjacent the bottom of the tank, means feeding a stream of water into the tank at the top thereof to form a column of water flowing downwardly across said predetermined path and located to engage the ball just prior to the contact thereof with the rebound plate to reduce the velocity of the ball, said column thereafter flowing into the ball catching cone in the path of movement of the balls rebounding from said rebound plate, a selecting chamber disposed below an opening in the bottom of said ball catching cone, a plurality of conveyors leading from the selecting chamber, and gate means in the selecting chamber for directing the balls received from the plate to said conveyors in accordance with the control signal for segregating said balls, said water in the cone flowing at a rate to insure movement of the ball through said cone to said selecting chamber before the control signal for a succeeding ball operates the gate means.

4. In a golf ball testing device, means for striking a ball with a predetermined force to propel the ball through a predetermined path to a receiver unit, and velocity measuring means disposed in said path to measure the velocity of the ball, said receiver unit having a downwardly and rearwardly inclined rebound plate against which the propelled balls impinge and rebound and a stream of water flowing downwardly across the path of the ball to intercept the ball prior to its contact with said plate to reduce the velocity thereof, said stream also being in position to engage and carry the rebound ball in the direction of rebound.

5. A receiver unit for use with a device for measuring the initial velocity of propelled articles moving through a predetermined path to segregate said articles in accordance with the measured velocity, said device having means for providing a control signal in accordance with the measured velocity, said receiver unit comprising a tank having a downwardly inclined rebound plate in said predetermined path against which the propelled articles are projected and rebound downwardly toward a receiving cone disposed below said plate, means feeding a stream of liquid into the tank at the top thereof to form a column of liquid flowing downwardly across said predetermined path and located to engage the article just prior to the contact thereof with the rebound plate and with the column of liquid flowing into the receiving cone in the path of movement of the articles rebounding from said rebound plate and controlling the movement of the articles in said cone, a plurality of conveyors leading from the bottom of the receiving cone, and segregating means including gate means at the bottom of the cone for directing the articles received from the plate to said conveyors in accordance with the control signal for segregating said articles.

6. A receiver unit for use with a device for measuring the initial velocity of a driven golf ball moving through a predetermined path, said device having means for providing a control signal in accordance with the measured velocity comprising a tank having a downwardly inclined rebound plate in said predetermined path against which the driven balls are projected and rebound downwardly toward a ball catching cone disposed in said tank to receive said rebound ball, means feeding a stream of liquid material into the tank at the top thereof to form a column of liquid material flowing downwardly across said predetermined path and located to engage the ball just prior to the contact thereof with the rebound plate to reduce the velocity thereof and also to engage and direct the rebound ball to the cone, a plurality of conveyors leading from the bottom of the catching cone, and gate means at the bottom of the cone for directing the ball rebound from the plate to said conveyors in accordance with the control signal for segregating said balls.

7. A receiver unit for use with a device for measuring the initial velocity of a driven golf ball moving through a predetermined path, said device having means for providing a control signal in accordance with the measured velocity, said receiver unit comprising a tank having a downwardly inclined rebound plate in said predetermined path against which the propelled balls are projected and rebound downwardly toward a ball catching cone disposed below said plate, means feeding a stream of water into the tank at the top thereof to form a column of water flowing downwardly across said predetermined path and located to engage the ball just prior to the contact thereof with the rebound plate and with the column of water flowing into the ball catching cone in the path of movement of the balls rebounding from said rebound plate, a plurality of conveyors leading from the bottom of the catching cone, and gate means at the bottom of the cone for directing the balls received from the plate to said conveyors in accordance with the control signal for segregating said balls.

8. A receiver unit for use with a device for measuring the initial velocity of a driven golf ball moving through a predetermined path, said device having means for providing a control signal in accordance with the measured velocity comprising a tank having a downwardly inclined rebound plate in said predetermined path against which the propelled balls are projected and rebound downwardly toward a ball catching cone adjacent the bottom of the tank, means feeding a stream of water into the tank at the top thereof to form a column of water flowing downwardly across said predetermined path and located to engage the ball just prior to the contact thereof with the rebound plate to reduce the velocity of the ball, said column of water thereafter flowing into the ball catching cone in the path of movement of the balls rebounding from said rebound plate, a selecting chamber disposed below an opening in the bottom of said ball catching cone, a plurality of conveyors leading from the selecting chamber, and gate means in the selecting chamber for directing the balls received from the plate to said conveyors in accordance with the control signal for segregating said balls, said water in the cone flowing at a rate to insure movement of the ball through said cone to said selecting chamber before the control signal for a succeeding ball operates the gate means.

References Cited by the Examiner

UNITED STATES PATENTS

| 2,314,063 | 3/1943 | Anderson et al. | 73—13 X |
| 2,631,454 | 3/1953 | Shepard et al. | 73—167 |

FOREIGN PATENTS 548,424   5/1929   Germany.

RICHARD C. QUEISSER, *Primary Examiner.*

E. D. GILHOOLY, *Assistant Examiner.*